United States Patent
Smetana et al.

(10) Patent No.: US 10,224,781 B2
(45) Date of Patent: Mar. 5, 2019

(54) ELECTRIC MOTOR WITH RETAINER DISC AND METHOD FOR ASSEMBLING SAME

(71) Applicant: Schaeffler Technologies AG & Co. KG, Herzogenaurach (DE)

(72) Inventors: Tomas Smetana, Herzogenaurach (DE); Kathrin Rosenkranz, Hemhofen (DE); Martin Brautigam, Rottenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 384 days.

(21) Appl. No.: 15/116,336

(22) PCT Filed: Dec. 5, 2014

(86) PCT No.: PCT/DE2014/200678
§ 371 (c)(1),
(2) Date: Aug. 3, 2016

(87) PCT Pub. No.: WO2015/113535
PCT Pub. Date: Aug. 6, 2015

(65) Prior Publication Data
US 2016/0352182 A1 Dec. 1, 2016

(51) Int. Cl.
*H02K 11/01* (2016.01)
*H02K 5/22* (2006.01)
(Continued)

(52) U.S. Cl.
CPC .............. *H02K 5/225* (2013.01); *H02K 3/50* (2013.01); *H02K 7/085* (2013.01); *H02K 11/21* (2016.01);
(Continued)

(58) Field of Classification Search
CPC ...... H02K 5/225; H02K 11/215; H02K 11/21; H02K 15/14
(Continued)

(56) References Cited

U.S. PATENT DOCUMENTS

| | | | | |
|---|---|---|---|---|
| 5,770,902 A | * | 6/1998 | Batten | H02K 5/225 310/68 D |
| 7,211,914 B2 | * | 5/2007 | Hofmann | H02K 5/10 310/68 R |

(Continued)

FOREIGN PATENT DOCUMENTS

| | | |
|---|---|---|
| DE | 102010000710 | 7/2011 |
| DE | 102012205754 | 10/2013 |
| JP | 2004040853 | 2/2004 |
| JP | 2010193680 | 9/2010 |

*Primary Examiner* — Hanh Nguyen
(74) *Attorney, Agent, or Firm* — Volpe and Koenig, P.C.

(57) ABSTRACT

The invention relates to an electric motor and a method for assembling the motor. Especially preferred is that the electric motor is for driving an antiroll stabilizer. The electric motor includes firstly a stator having at least one electromagnet and a rotor which can rotate about an axis relative to the stator. The electric motor also includes at least one bearing plate for receiving a bearing for rotatable mounting of the rotor. Disposed on the bearing plate is a retainer disc for retaining contacts. The contacts are for electrical connection of the at least one electromagnet of the stator and pass through the retainer disc. Fastening elements are used to fasten the retainer disc to the bearing plate. There is also a positioning arrangement for radial positioning of the retainer disc with respect to the bearing plate. According to the invention the positioning arrangement is designed for adjustable radial positioning of the retainer disc with respect to the bearing plate.

10 Claims, 2 Drawing Sheets

(51) Int. Cl.
    *H02K 3/50*     (2006.01)
    *H02K 11/215*     (2016.01)
    *H02K 11/33*     (2016.01)
    *H02K 11/21*     (2016.01)
    *H02K 7/08*     (2006.01)
    *H02K 15/14*     (2006.01)

(52) U.S. Cl.
    CPC .......... *H02K 11/215* (2016.01); *H02K 11/33* (2016.01); *H02K 15/14* (2013.01); *H02K 2211/03* (2013.01); *H02K 2213/09* (2013.01)

(58) Field of Classification Search
    USPC .............................................. 310/71, 88, 89
    See application file for complete search history.

(56) References Cited

U.S. PATENT DOCUMENTS

| | | | |
|---|---|---|---|
| 8,659,193 B2* | 2/2014 | Yamasaki | H02K 11/33 310/64 |
| 8,816,548 B2* | 8/2014 | Tomizawa | H02K 11/33 310/67 R |
| 9,006,961 B2 | 8/2015 | Helmi | |
| 2004/0145261 A1* | 7/2004 | Ganter | H02K 3/50 310/91 |
| 2010/0133935 A1 | 6/2010 | Kinugawa et al. | |
| 2010/0237721 A1 | 9/2010 | Ishizue et al. | |
| 2015/0069862 A1 | 3/2015 | Bulatow | |
| 2015/0171709 A1* | 6/2015 | Ito | H02K 5/225 310/52 |

\* cited by examiner

ELECTRIC MOTOR WITH RETAINER DISC AND METHOD FOR ASSEMBLING SAME

BACKGROUND

The present invention relates to an electric motor that has a retainer disc mounted on a bearing plate for holding contacts. The electric motor is provided, in particular, for applications in motor vehicles, for example, for driving an electromechanical roll stabilizer, for driving a steering system, or for driving a ride-height control system. In addition, the invention relates to a method for assembling the motor according to the invention.

DE 10 2012 205 754 A1 shows a housing for a rotating electrical machine with a bearing plate between a housing outer part and a housing inner part. A rotor position sensor is mounted on a sensor holder.

DE 10 2010 000 710 A1 shows a bearing plate for an electric motor that has a current guide that is designed to connect at least one winding of the stator to a current connection.

From DE 299 01 976 U1, an electric motor is known with an arrangement for monitoring the rotational speed in which a sensor element is arranged so that it can be connected to an inner wall of a bearing plate.

FIG. 3 shows a cross section of a detail of an electric motor according to the prior art. The electric motor comprises a stator 01 and a rotor 02. The rotor 02 can be rotated relative to the stator 01 about an axis 03. The rotor 02 comprises a rotor shaft 04 that is supported so that it can rotate in a bearing 06. The bearing 06 sits in a bearing plate 07 that is mounted on a motor housing 08. The motor housing 08 with the stator 01 located therein and bearing plate 07 are mounted within a system housing 09.

The stator 01 comprises an electromagnet (hidden in the illustration) out of which multiple conductors 11 project for the electrical connection of the electromagnet. The electromagnet of the stator 01 comprises a laminated core with windings (not shown) located on this core. The conductors 11 are guided through the bearing plate 07. On the bearing plate 07 there is a retainer disc 12 made from a plastic for holding contacts 13. The retainer disc 12 is arranged coaxial to the axis 03 and axially next to the bearing plate 07. The retainer disc 12 is mounted on one side with screws 14 on the bearing plate 07. On the other side, the retainer disc 12 has guide pins 16 that determine the radial position of the retainer disc 12. In addition, the contacts 13 are mounted on the conductors 11 of the electromagnet of the stator 01 so that the position of the retainer disc 12 is overdetermined relative to the bearing plate 07. This can lead to mechanical voltages on the contacts 13 that can have effects on a power electronics module 17 that is connected rigidly to the contacts 13 with the help of contact screws 18. In particular, this can lead to deformation of a printed circuit board 19 of the power electronics module 17. The deformation is shown by a dimension s.

The retainer disc 12 further has sensor guide pins 21 for determining the radial position of a sensor electronics module 22. The sensor electronics module 22 is opposite an angular position and rotational speed encoder 23 that is made from a permanently magnetic material and is mounted on the rotor shaft 04. The sensor electronics module 22 and the angular position and rotational speed encoder 23 form a rotational speed sensor for measuring the rotational speed of the electric motor. The over-fixing of the position of the retainer disc 12 described above can lead to displacements of the retainer disc 12 which lead, in turn, to displacements of the sensor electronics module 22 in the form of an eccentricity e and therefore can negatively affect the accuracy of the rotational speed sensor.

FIG. 4 shows the retainer disc 12 shown in FIG. 3 in a plan view. The screws 14 (shown in FIG. 1) are guided by circular round fastener openings 24 in the retainer disc 12. The fastener openings 24 are each formed within a metallic insert bushing that is inserted into the retainer disc 12.

SUMMARY

The objective of the present invention is to increase the accuracy of the positioning of retainer discs relative to a bearing plate in an electric motor starting from the known prior art.

The specified object is achieved by an electric motor according to one or more features of the invention and by a method.

The electric motor according to the invention is used for the rotational drive of a machine element, preferably for the rotational drive of a machine element of a vehicle. In an especially preferred way, the electric motor is formed for driving an electromechanical roll stabilizer, for driving a steering system, or for driving a ride-height control system of a motor vehicle. The electric motor according to the invention first comprises a stator with at least one electromagnet that preferably has a laminated core with windings located on this core. The stator preferably comprises multiple electromagnets for a multi-phase operation of the electric motor. The electric motor further comprises a rotor that can rotate relative to the stator about an axis. The rotor preferably has a permanent magnet. The electric motor comprises at least one bearing plate for holding a bearing for the rotational support of the rotor. The bearing plate is arranged at an axial end of the stator. If two of the bearing plates are present, each of the bearing plates forms an axial termination of the stator. The bearing is preferably a roller bearing. The bearing sits fixed in the bearing plate and is held by this plate relative to the stator.

On the bearing plate there is a retainer disc for holding contacts. The contacts are used for the electrical connection of the at least one electromagnet of the stator and are guided through the retainer disc. The contacts sit fixed in the retainer disc.

The electric motor further comprises individual fasteners for fastening the retainer disc on the bearing plate. The retainer disc is mounted on the bearing plate with the help of fasteners.

The electric motor further comprises a positioning arrangement for the radial positioning of the retainer disc relative to the bearing plate.

According to the invention, the positioning arrangement is formed for the variable radial positioning of the retainer disc relative to the bearing plate. The positioning arrangement thus allow the radial position of the retainer disc to change relative to the bearing plate before the retainer disc is mounted on the bearing plate with the help of the fasteners.

The retainer disc preferably has a shape that permits radial movement of the retainer disc relative to the bearing plate before the retainer disc is fastened. After the retainer disc is fastened, the radial movement of the retainer disc relative to the bearing plate is prevented directly just by the fasteners. Thus, the shape of the retainer disc and the shape of the bearing plate do not determine the position of the retainer disc relative to the bearing plate, but instead ultimately the fasteners. While the shape of the retainer disc and the shape of the bearing plate enable the degree of freedom of the retainer disc in the radial direction at least for a movement in the scope of play, the fasteners permit no degree of freedom of the retainer disc. In particular, the retainer disc has no positive-fit guidance, in particular, no guide elements, which determine the radial position of the retainer disc relative to the bearing plate completely and without play due to their shape. The retainer disc is preferably connected to the bearing plate not with a positive fit connection in the radial direction. The specified radial direction is with respect to the axis of the electric motor.

A special advantage of the electric motor according to the invention is provided in that, due to the variable adjustability of the positioning arrangement and due to an elimination of a positive-fit guide, multiple problems of the solutions according to the prior art are avoided.

The fasteners are preferably formed for non-positive-fit or adhesive-bond fastening of the retainer disc on the bearing plate. These fasteners enable an adjustment of the radial position of the retainer disc relative to the bearing plate during assembly. This adjustment is not prevented by the shape of the retainer disc. In particular, no guide elements of the retainer disc prevent such adjustment. In each case, the shape of the retainer disc and the shape of the bearing plate determine the radial position of the retainer disc relative to the bearing plate at least not completely, but instead allow at least radial play before the retainer disc is mounted on the bearing plate with the help of the fasteners.

The fasteners and the retainer disc are formed preferably by individual components. The fasteners and the retainer disc are not constructed integrally as one unit.

The electric motor preferably has a cylindrical lateral surface-shaped housing that surrounds at least the stator and the bearing plate circumferentially. The electric motor can also have another housing, for example, a system housing that surrounds additional components of the electric motor.

The retainer disc is preferably arranged in the axis of the electric motor so that the retainer disc is arranged coaxial to the rotor and stator. The bearing plate is also preferably arranged in the axis of the electric motor so that the retainer disc and the bearing plate are also arranged coaxial to each other.

The retainer disc is preferably arranged axially adjacent to the bearing plate. In an especially preferred way, the retainer disc is arranged axially directly adjacent to the bearing plate. The bearing plate is preferably arranged axially between the stator and the retainer disc. Consequently, the retainer disc is arranged farther outside than the bearing plate.

The retainer disc preferably has the outer shape of a flat cylinder, in particular, a flat hollow cylinder. The retainer disc is made preferably from a plastic.

The fasteners are preferably arranged at a distance to the axis. The fasteners extend preferably parallel to the axis.

The fasteners are preferably guided through fastener openings in the retainer disc. Thus, the fasteners cause a non-positive-fit connection between the retainer disc and the bearing plate.

The fasteners preferably have a cylindrical base shape. The fasteners are preferably formed by screws or rivets. The electric motor preferably comprises between two and five of the fasteners, in an especially preferred way, exactly three of the fasteners.

The positioning arrangement is preferably formed in or on the retainer disc.

The positioning arrangement is preferably formed by the fastener openings in the retainer disc. Here, the fastener openings have a larger cross section than the fasteners so that the fasteners allow a radial play of the retainer disc relative to the bearing plate with respect to the axis of the electric motor as long as the fastening process with the fasteners is not yet completed. In each case, due to the larger cross section of the fastener openings, the exact radial position of the retainer disc relative to the bearing plate is not yet predefined.

The fastener openings with the larger cross section preferably have an elliptical or an oval cross section, wherein a longer axis of the elliptical or oval cross section is arranged parallel to a radius that extends on the retainer disc from the axis to the contacts. This shape of the fasteners allows an alignment of the retainer disc during assembly through a radial displacement of the contacts, so that the contacts can be oriented relative to the elements to be connected to the contacts and later over-fixing after completion of the assembly is prevented.

The fastener openings are preferably each formed within a metallic insert bushing that is sunk into the retainer disc and forms an integral component of the retainer disc.

The metallic contacts are preferably mounted by injection molding in the retainer disc made from plastic. This type of fastener can indeed lead to an inexact position of the contacts in the retainer disc, but this inexactness due to the lack of a positive-fit connection in the radial direction between the retainer disc and the bearing plate does not result in over-fixing of the position of the retainer disc.

The contacts are preferably arranged spaced-apart to the axis. The contacts extend preferably parallel to the axis. The contacts are preferably formed by metallic conductor elements.

The contacts are preferably mounted on conductors extending out from the electromagnet, in order to create an electrical connection between the contacts and the electromagnet so that current can flow to the electromagnet of the stator via the contacts. The contacts are preferably welded onto the conductors projecting out from the electromagnet.

In preferred embodiments of the electric motor according to the invention, this further comprises a power electronics module that is connected rigidly to the contacts guided through the retainer disc. Here, the retainer disc is arranged axially between the stator and the power electronics module so that the contacts form an electrical connection running through the retainer disc between the power electronics module and the electromagnet of the stator. The power electronics module is preferably mounted with contact fasteners to the contacts of the retainer disc. The contact fasteners are preferably formed by contact screws. The power electronics module is used for the electrical control of the electric motor.

The power electronics module is preferably arranged axially directly adjacent to the retainer disc. The power electronics module is arranged preferably spaced-apart to the axis. Preferably, the power electronics module is located on the circumference of the electric motor, for example, directly under a cylindrical lateral surface-shaped housing of the electric motor.

The power electronics module preferably comprises a printed circuit board that extends parallel to the axis of the electric motor. The printed circuit board is preferably connected rigidly to the contacts of the retainer disc. The printed circuit board and the contacts are preferably arranged at an equal distance to the axis.

In preferred embodiments of the electric motor according to the invention, this further comprises a rotational speed sensor. The rotational speed sensor preferably comprises an angular position and/or rotational speed encoder connected rigidly to the rotor and a sensor electronics module whose radial position is defined directly by the bearing plate. In contrast to the prior art, the radial position of the sensor electronics module is not defined by the retainer disc so that over-fixing of the retainer disc is prevented. Radial displacement of the retainer disc can also not have the result that the accuracy of the rotational speed sensor is negatively affected.

The sensor electronics module is preferably arranged in the axis of the electric motor. The retainer disc is preferably arranged between the bearing plate and the sensor electronics module. The power electronics module and the sensor electronics module are preferably located at the same axial position.

The sensor electronics module preferably has guide pins by which it is guided in the bearing plate, whereby the radial position of the sensor electronics module is defined. For this purpose, the bearing plate preferably has guide openings that hold the guide pins without play. The guide pins are guided through guide pin openings in the retainer disc, which hold the guide pins with play. The guide pins are preferably spaced apart and oriented parallel to the axis of the electric motor.

The guide pin openings in the retainer disc have a larger cross section than the guide pins. Thus, the sensor electronics module and the retainer disc can be slightly displaced in the radial direction during assembly without the guide pins of the sensor electronics module and the retainer disc contacting against each other and this resulting in an over-fixing of the position of the retainer disc.

The guide pin openings preferably have an ellipse-like or oval cross section, wherein a longer axis of the ellipse-like or oval cross section is arranged parallel to a radius that extends on the retainer disc from the axis to the contacts. This shape of the guide pin openings allows an alignment of the retainer disc during assembly by a radial displacement of the contacts, so that the contacts can be oriented relative to the elements to be connected to the contacts and later over-fixing after completion of the assembly is prevented.

The electric motor according to the invention can comprise additional electronics modules, in particular, additional sensor electronics modules, e.g., a temperature sensor electronics module, which are guided in the same way as the sensor electronics module of the rotational speed sensor with the help of guide pins in the bearing plate.

The method according to the invention is used for assembling the electric motor according to the invention. In one step of this method, an axial positioning of the retainer disc next to the bearing plate is realized. An alignment of the retainer disc relative to the bearing plate in the radial direction is also realized, in order to set, in particular, the exact position of the contacts. This alignment is possible, because the positioning arrangement is formed according to the invention for the variable radial positioning of the retainer disc relative to the bearing plate. After the radial alignment, the retainer disc is mounted on the bearing plate by attaching the fasteners. Furthermore, the contacts are mounted on the electromagnet of the stator, which is also realized after the radial alignment of the retainer disc.

One special advantage of the method according to the invention is that the assembly does not lead to over-fixing of the position of the retainer disc. Thus, deviations of the position of the contacts in the retainer disc cannot have the result that the retainer disc becomes warped. Such deviations could be produced if the retainer disc is made from plastic when the metallic contacts are injection molded.

The electric motor to be produced according to the method according to the invention preferably also has such features that are specified as preferred for the electric motor according to the invention.

For the radial orientation of the retainer disc, preferably a gauge is used that represents a minimum permissible distance between the contacts and an inside of a housing of the electric motor. This distance corresponds to a height of the power electronics module that can be determined, in particular, by a cooling body of the power electronics module. The use of the gauge guarantees that a sufficiently large space is maintained in the interior of the electric motor for the power electronics module to be installed and the assembly does not lead to mechanical stresses that can act, in particular, on the retainer disc. The gauge is preferably formed by a prism.

BRIEF DESCRIPTION OF THE DRAWINGS

Other advantages, details, and refinements of the invention are given from the following description of a preferred embodiment of the electric motor according to the invention with reference to the drawing. Shown are.

DETAILED DESCRIPTION OF THE PREFERRED EMBODIMENTS

Figure 1:
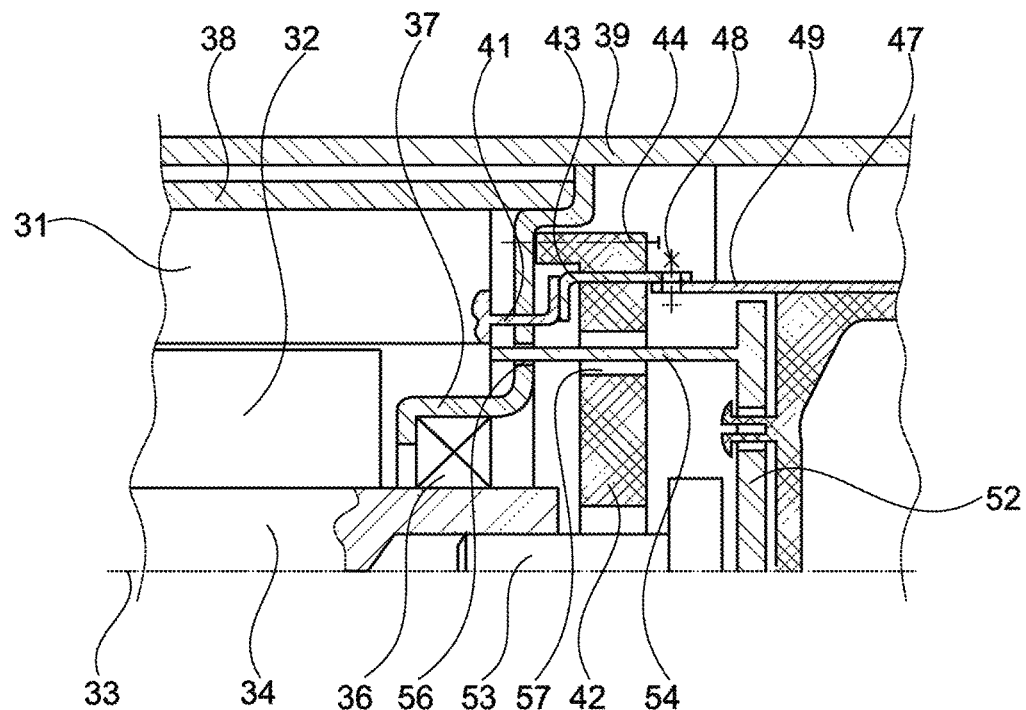
FIG. 1: a cross section of a detail of a preferred embodiment of an electric motor according to the invention.

FIG. 1 shows a cross section of a detail of a preferred embodiment of an electric motor according to the invention. The electric motor comprises a stator 31 and a rotor 32. The rotor 32 can be rotated relative to the stator 31 about an axis 33. The rotor 32 comprises a rotor shaft 34 that is supported so that it can rotate in a roller bearing 36. The roller bearing 36 sits in a bearing plate 37 that is mounted on a motor housing 38. The motor housing 38 with the stator 31 and bearing plate 37 located in this housing are mounted within a system housing 39.

The stator 31 comprises an electromagnet (hidden in the illustration) from which multiple conductors 41 project for the electrical connection of the electromagnet. The electromagnet of the stator 31 comprises a laminated core with windings (not shown) located on this core. The conductors 41 are guided through the bearing plate 37. A retainer disc 42 made from a plastic for holding contacts 43 sits on the bearing plate 37. The retainer disc 42 is arranged coaxial to the axis 33 and axially next to the bearing plate 37.

The retainer disc 32 is mounted only with screws 44 on the bearing plate 37. The retainer disc 32 has no direct positive-fit connection to the bearing plate 37 that determines the radial position of the retainer disc 12 relative to the bearing plate 37.

The contacts 43 are mounted on the conductors 41 of the electromagnet of the stator 31, which, however, does not lead to an over-fixing of the position of the retainer disc 42 in the electric motor according to the invention, because the welding of the contacts 43 is realized with the conductors 41 only after a radial orientation of the retainer disc 42 relative to the bearing plate 37.

The electric motor further comprises a power electronics module 47 with a printed circuit board 49 that is connected rigidly to the contacts 43 with the help of contact screws 48.

Figure 3:
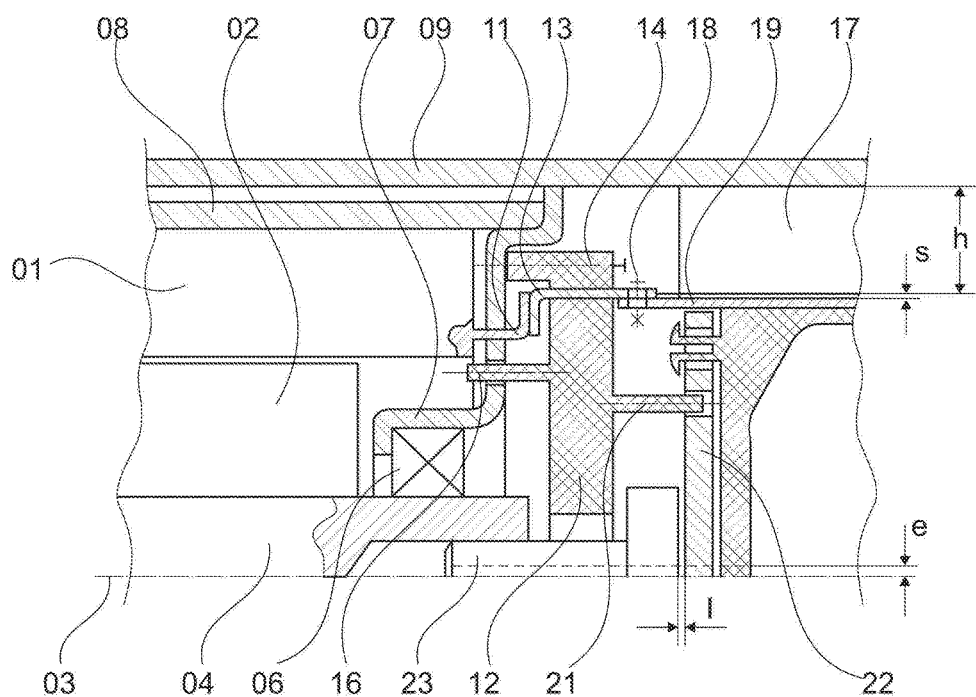
FIG. 3: a cross section of a detail of an electric motor according to the prior art.
Figure 4:
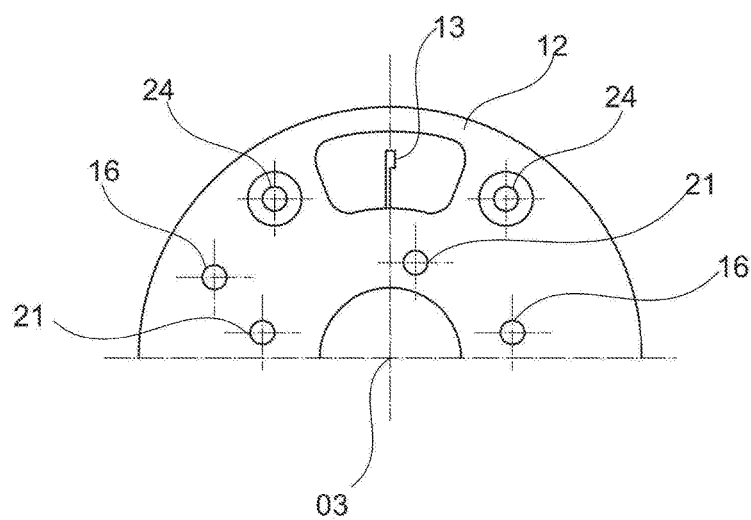
FIG. 4: a retainer disc shown in FIG. 3 in a plan view.

In the electric motor according to the invention, however, no mechanical stress acts on the power electronics module 47 and especially on the printed circuit board 49, because the retainer disc 42 is oriented in the radial direction with the help of a gauge (not shown) so that a distance h (shown in FIG. 3) is guaranteed between the contacts 43 and the system housing 39.

The electric motor further comprises a rotational speed sensor for measuring the rotational speed of the electric motor. The rotational speed sensor is formed by a sensor electronics module 52 and by an angular position and rotational speed encoder 53 which are opposite each other. The angular position and rotational speed encoder 53 consists of a permanently magnetic material and is mounted on the rotor shaft 34.

The sensor electronics module 52 has guide pins 54 with which it is guided in guide openings 56 in the bearing plate 37, whereby a radial position of the sensor electronics module 52 is defined. The guide openings 56 hold the guide pins 54 in an accurately fitting way so that the radial position of the sensor electronics module 52 is defined by a positive fit connection with the bearing plate 37. The guide pins 54 project with a clear play through guide pin openings 57 into the retainer disc 42 so that the guide pin openings 57 do not define the radial position of the guide pins 54.

Figure 2:
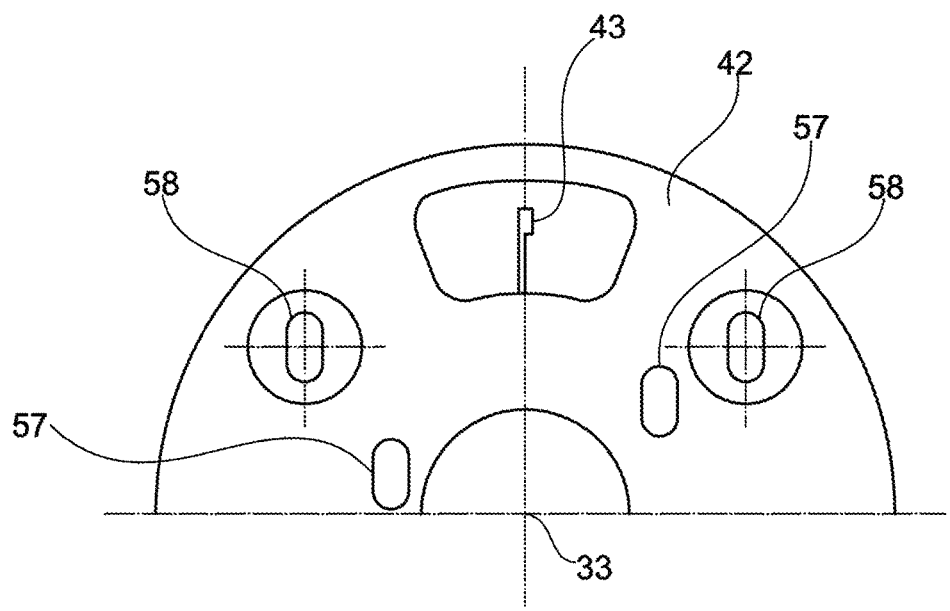
FIG. 2: a retainer disc shown in FIG. 1 in a plan view.

FIG. 2 shows the retainer disc 42 shown in FIG. 1 in a plan view. The screws 44 (shown in FIG. 1) are guided through oval fastener openings 58 in the retainer disc 42. The oval cross section of the fastener openings 58 is oriented such that the longer axis of the oval is oriented parallel to a radius of the circular shape of the retainer disc 42 that extends from the axis 33 to the contact 43. The oval fastener openings 58 are each formed within a metallic insert bushing that is sunk into the retainer disc 42. Due to their oval cross section, the oval fastener openings 58 permit a variable radial positioning of the retainer disc 42 relative to the bearing plate 37 before the retainer disc 42 was mounted on the bearing plate 37 with the help of the screws 44.

The guide pin openings 57 also have an oval cross section whose longer axis is oriented parallel to the specified radius of the circular shape of the retainer disc 42 that extends from the axis 33 to the contact 43.

The oval cross sections of the fastener openings 58 for the screws 44 and the guide pin openings 57 allow the retainer disc 42 to be displaced during the assembly of the electric motor radially in the direction of the contacts 43, in order to prevent an over-fixing by the fastening of the contacts 43 and the screws 44.

LIST OF REFERENCE NUMBERS

01 Stator
02 Rotor
03 Axis
04 Rotor shaft
06 Bearing
07 Bearing plate
08 Motor housing
09 System housing
11 Conductor
12 Retainer disc
13 Contact
14 Screw
16 Guide pin
17 Power electronics module
18 Contact screw
19 Printed circuit board
21 Sensor guide pin
22 Sensor electronics module
23 Angular position and rotational speed encoder
24 Fastener opening
31 Stator
32 Rotor
33 Axis
34 Rotor shaft
36 Roller bearing
37 Bearing plate
38 Motor housing
39 System housing
41 Conductor
42 Retainer disc
43 Contact
44 Screw
47 Power electronics module
48 Contact screw
49 Printed circuit board
52 Sensor electronics module
53 Angular position and rotational speed encoder
54 Guide pin
56 Guide opening
57 Guide pin opening
58 Fastener opening

The invention claimed is:

1. An electric motor comprising:
   a stator with at least one electromagnet;
   a rotor that is rotatable relative to the stator about an axis;
   a bearing plate that holds a bearing for supporting the rotor,
   a retainer disc arranged on the bearing plate and through which contacts are guided for electrical connection of the electromagnet of the stator and are held by the retainer disc,
   fasteners that fasten the retainer disc on the bearing plate, and
   a positioning arrangement that radially positions the retainer disc relative to the bearing plate,
   the positioning arrangement is configured for a variable radial positioning of the retainer disc relative to the bearing plate.

2. The electric motor according to claim 1, wherein the positioning arrangement is constructed in the retainer disc.

3. The electric motor according to claim 2, wherein the positioning arrangement is formed by fastener openings in the retainer disc, the fasteners are guided through the fastener openings in the retainer disc and the fastener openings have a greater cross section than the fasteners.

4. The electric motor according to claim 3, wherein the fastener openings have an ellipse-shaped cross section or an oval cross section, and a longer axis of the ellipse-shaped cross section or the oval cross section is arranged parallel to a radius that extends on the retainer disc from the axis to the contacts.

5. The electric motor according to claim 1, wherein further comprising a power electronics module connected rigidly to the contacts guided through the retainer disc.

6. The electric motor according to claim 1, further comprising a rotational speed sensor that comprises at least one of an angular position or rotational speed encoder and a sensor electronics module connected rigidly to the rotor whose radial position is defined relative to the bearing plate.

7. The electric motor according to claim 6, wherein the sensor electronics module has guide pins by which said sensor electronics module is guided on the bearing plate, the guide pins are guided through guide pin openings in the retainer disc that have a larger cross section than the guide pins.

8. The electric motor according to claim 7, wherein the guide pin openings have an ellipse-shaped cross section or an oval cross section, and a longer axis of the ellipse-shaped cross section or the oval cross section is arranged parallel to a radius that extends on the retainer disc from the axis to the contacts.

9. A method for mounting an electric motor according to claim 1, comprising the following steps:
- axially positioning the retainer disc next to the bearing plate,
- radially aligning the retainer disc opposite the bearing plate,
- fastening the retainer disc on the bearing plate by attachment of the fasteners, and
- fastening the contacts on the electromagnet of the stator.

10. The method according to claim 9, wherein the radially aligning of the retainer disc opposite the bearing plate is carried out with a gauge that represents a minimum permissible distance between the contacts and an inside of a housing of the electromagnet.

* * * * *